US012687692B2

(12) United States Patent
Yasutomi

(10) Patent No.: US 12,687,692 B2
(45) Date of Patent: Jul. 21, 2026

(54) OPTICAL FIBER RIBBON

(71) Applicant: FURUKAWA ELECTRIC CO., LTD., Tokyo (JP)

(72) Inventor: Tetsuya Yasutomi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 192 days.

(21) Appl. No.: 18/389,387

(22) Filed: Nov. 14, 2023

(65) Prior Publication Data

US 2024/0085654 A1        Mar. 14, 2024

Related U.S. Application Data

(63) Continuation of application No. PCT/JP2022/017276, filed on Apr. 7, 2022.

(51) Int. Cl.
G02B 6/44 (2006.01)

(52) U.S. Cl.
CPC ........... G02B 6/4482 (2013.01); G02B 6/448 (2013.01)

(58) Field of Classification Search
CPC .............................. G02B 6/4482; G02B 6/448
See application file for complete search history.

(56) References Cited

U.S. PATENT DOCUMENTS

| | | | |
|---|---|---|---|
| 8,548,294 B2 | 10/2013 | Toge et al. | |
| 2018/0149821 A1 | 5/2018 | Bringuier et al. | |

| | | | |
|---|---|---|---|
| 2018/0273427 A1 | 9/2018 | Tanaka et al. | |
| 2020/0292771 A1* | 9/2020 | Sekine | ................... G02B 6/448 |
| 2023/0041025 A1* | 2/2023 | Nakamura | ............ G03F 7/0047 |

FOREIGN PATENT DOCUMENTS

| | | | | |
|---|---|---|---|---|
| EP | 3693775 A1 | | 8/2020 | |
| EP | 3882680 A2 | | 9/2021 | |
| JP | 2005165227 A | | 6/2005 | |
| JP | 2014058649 A | | 4/2014 | |
| JP | 2014205780 A | * | 10/2014 | |
| JP | 2017181513 A | | 10/2017 | |
| JP | 2019066802 A | | 4/2019 | |

(Continued)

OTHER PUBLICATIONS

Office Action issued in JP Pat. Appl. No. 2021-009657, dated Nov. 16, 2021.

(Continued)

*Primary Examiner* — Thomas A Hollweg
*Assistant Examiner* — Kirsten D. Endresen
(74) *Attorney, Agent, or Firm* — MARSHALL, GERSTEIN & BORUN LLP

(57) ABSTRACT

An optical fiber ribbon includes a plurality of colored single fibers that are arranged side by side, and the adjacent single fibers are coupled by coupling resin. The single fibers are disposed leaving a gap between the single fibers. The adjacent single fibers are bonded to each other intermittently by coupling parts at predetermined intervals in a longitudinal direction. That is, the coupling parts between the adjacent single fibers are disposed intermittently with regard to the longitudinal direction of the single fibers. The coupling parts are formed of opaque coupling resin. A haze value of the coupling resin according to JIS K 7136 is preferably between 1.5% and 3%, for example.

4 Claims, 3 Drawing Sheets

(56)             References Cited

FOREIGN PATENT DOCUMENTS

| | | | |
|---|---|---|---|
| JP | 2020134581 | A | 8/2020 |
| JP | 7052100 | B1 | 4/2022 |
| WO | WO-2017094560 | A1 | 6/2017 |
| WO | WO-2018117068 | A1 | 6/2018 |
| WO | WO-2021181884 | A1 | 9/2021 |

OTHER PUBLICATIONS

International Search Report issued in International Pat. Appl. No. PCT/JP2022/017276, dated May 17, 2022.
First Examination Report, India patent application No. 202347074438, mailing date May 12, 2026.

* cited by examiner

OPTICAL FIBER RIBBON

TECHNICAL FIELD

The present invention relates to an optical fiber ribbon in which a plurality of single optical fibers are coupled to each other.

BACKGROUND

As an optical fiber for high-speed transmission of large capacity data, an optical fiber ribbon has been used to facilitate operations and accommodation in a cable. The optical fiber ribbon includes a plurality of single optical fibers (hereinafter, single fibers) that are arranged side by side in parallel and bonded to each other. In the optical fiber ribbon, single fibers arranged side by side are fixed with resin over an entire length thereof in some cases, and, in other cases, single fibers are bonded to each other intermit- tently in a longitudinal direction. The intermittent bonding between the single fibers can increase fiber density, reduce transmission loss due to bending, and facilitate fiber sepa- ration.

Such an optical fiber ribbon is manufactured by arranging a plurality of single fibers in a manufacturing line, applying adhesive resin at predetermined positions of the single fibers, and then curing the adhesive resin. At this time, to check if the single fibers are bonded to each other with certainty, there is a method including lighting an optical fiber ribbon from one side and detecting distributions of quantity of light transmitted through the optical fiber ribbon (see Japanese Unexamined Patent Application Publication No. 2017-181513 (JP-A-2017-181513).

However, it has been difficult for the conventional method to provide highly accurate detection. For example, bonded coupling parts may transmit some light, and this may be taken as defective bonding. If sensitivity is raised to over- come this problem so that even a slight change in the light quantity can be taken as adhesive resin, then parts with insufficient adhesive resin may be taken as successful bond- ing.

The present invention was made in view of such prob- lems. It is an object of the present invention to provide an intermittently bonded optical fiber ribbon and the like, of which quality of coupling parts can be easily managed.

SUMMARY OF THE DISCLOSURE

To achieve the above object, an aspect of the present invention is an optical fiber ribbon including a plurality of single fibers that are arranged side by side, in which the adjacent single fibers are coupled to each other with cou- pling resin. Coupling parts between the adjacent single fibers are disposed intermittently with regard to a longitu- dinal direction of the single fibers. The coupling resin is opaque, and a haze value of the coupling resin according to JIS K 7136 is between 1.5% and 3%. The single fibers are colored with haze values of 90% or more.

It is preferable that there is a gap formed between the adjacent single fibers.

Pigment may be mixed into the coupling resin and the coupling resin may be colored.

Air bubbles may be mixed into the coupling resin.

According to the present invention, the coupling resin coupling the single fibers to each other is opaque, and this can reduce light being transmitted through the coupling resin. Thus, compared to a case of using common transpar- ent resin, the coupling resin can be detected more accurately.

At this time, it is more effective if the haze value of the coupling resin according to JIS K 7136 is 1.5% or higher. Also, if the haze value according to JIS K 7136 is 3% or lower, an appearance of the coupling resin is good and colored layers of the single-cored fibers are visually recog- nizable, which can improve handling performance.

Also, the haze value of the coupling resin can be easily adjusted by mixing pigment into the coupling resin.

Also, the coupling resin can be made opaque by mixing micro air bubbles into the coupling resin.

The present invention can provide an intermittently bonded optical fiber ribbon and the like, of which quality of coupling parts can be easily managed.

DETAILED DESCRIPTION

Figure 1:
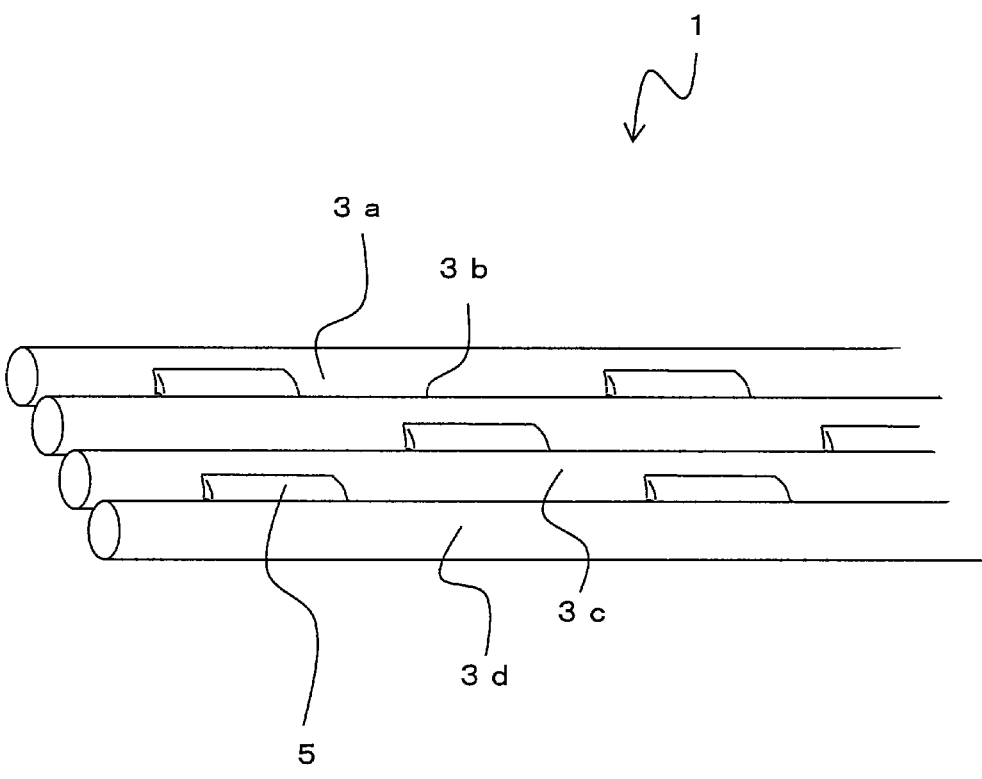
FIG. 1 is a perspective view showing an optical fiber ribbon 1.

Hereinafter, an embodiment of the present invention will be described with reference to the accompanying drawings. FIG. 1 is a perspective view showing an optical fiber ribbon 1, and FIG. 2 is a cross-sectional view showing the optical fiber ribbon 1.

The optical fiber ribbon 1 includes a plurality of single fibers 3a, 3b, 3c, and 3d that are arranged side by side, and the adjacent single fibers are coupled by coupling resin. The descriptions below will illustrate an example in which the optical fiber ribbon is formed of four single fibers, 3a, 3b, 3c, and 3d. However, the present invention is not limited thereto and any optical fiber ribbons formed of a plurality of single fibers are applicable.

Figure 2:
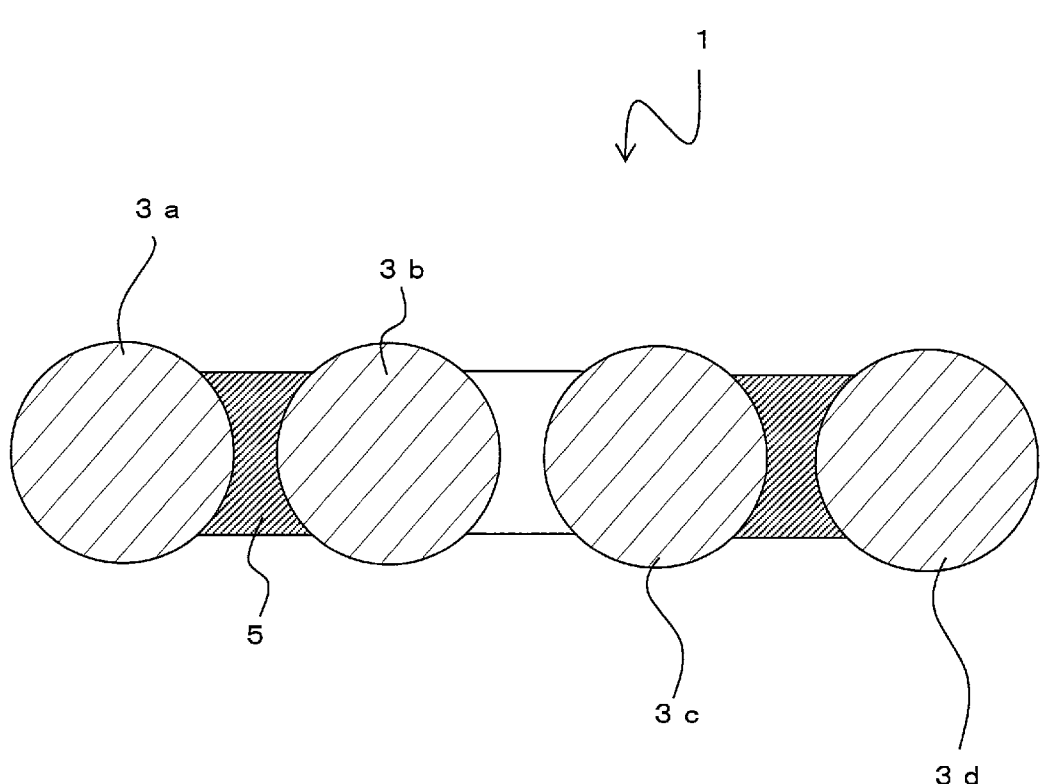
FIG. 2 is a cross-sectional view showing the optical fiber ribbon 1.

As shown in FIG. 2, the single fibers 3a, 3b, 3c, and 3d are disposed leaving a gap between the single fibers. Although detailed illustrations are omitted here, each of the single fibers 3a, 3b, 3c, and 3d includes an inner glass fiber, a primary layer and a secondary layer (resin layers) that are formed coating the glass fiber, and a colored layer on the outermost periphery. That is, the single fibers 3a, 3b, 3c, and 3d are colored. The colored layers of the single fibers 3a, 3b, 3c, and 3d are in different colors so that the single fibers 3a, 3b, 3c, and 3d are distinguishable from one another, and colors of the colored layers are adjusted so that haze values thereof are 90% or more for visual recognition improve- ment. That is, the colored layers of the single fibers 3a, 3b, 3c, and 3d hardly transmit light travelling from a side.

The adjacent single fibers 3a, 3b, 3c, and 3d are bonded to each other by coupling parts 5 intermittently at predeter- mined intervals in a longitudinal direction. That is, the coupling parts 5 between the adjacent single fibers 3a, 3b, 3c, and 3d are disposed intermittently with regard to the longitudinal direction of the single fibers. The coupling parts 5 that are adjacent with regard to a width direction of the optical fiber ribbon 1 are arranged in a zigzag arrangement with regard to a longitudinal direction of the optical fiber ribbon 1, for example.

That is, a bonding position (the coupling part 5) between the single fibers 3b and 3c is formed to be displaced approximately a half pitch from a bonding position (the coupling part 5) between the single fibers 3*a* and 3*b* as well as from a bonding position (the coupling part 5) between the single fibers 3*c* and 3*d* with regard to the longitudinal direction of the optical fiber ribbon 1. Thus, the bonding position between the single fibers 3*a* and 3*b* and the bonding position between the single fibers 3*c* and 3*d* are at the same position with regard to the longitudinal direction.

The arrangement of the coupling parts 5 is not limited to the zigzag arrangement, and the coupling parts 5 may be disposed in any arrangements in which the coupling parts 5 between the adjacent single fibers are intermittently disposed in the longitudinal direction. However, it is preferable that all the coupling parts 5 between each of the adjacent single fibers are formed to have almost the same pitch with regard to the longitudinal direction of the optical fiber ribbon 1. This prevents disarrangement of the single fibers at the time of laying or the like of the optical fiber ribbon 1.

The coupling parts 5 are formed of opaque coupling resin. A haze value of the coupling resin according to JIS K 7136 is preferably between 1.5% and 3%, for example. If the haze value of the coupling resin is less than 1.5%, quantity of light transmitted through the coupling part 5 increases and thus there is only a little effect of opaqueness of the coupling parts.

On the other hand, if the haze value of the coupling resin is more than 3%, the coupling part 5 may appear to be dull in color, deteriorating its appearance. Also, this makes it difficult to distinguish between the colors of the colored layers of the single fibers that are covered by the coupling resin. Moreover, if the coupling resin is UV curable resin and the haze value thereof exceeds 3%, light irradiated may not reach deep inside the coupling resin. This may require longer curing time and a large number of UV lamps, and may slow down the manufacturing speed One way to make the coupling resin opaque is to mix pigment into the coupling resin to give a color, for example. In this case, the color of the coupling resin can be decided by selecting pigment. Thus, by making the color of the coupling resin different from the colors of the colored layers of the single fibers, the colored layers and the coupling resin are easily distinguishable. Also, by making the color of the coupling resin same as the color of any one of the single fibers that are to be coupled by the coupling parts 5, it is possible to make the coupling parts 5 not to stand out in appearance. Also, making the pigment color lighter can make the coupling parts still opaque but unnoticeable.

Another way to make the coupling resin opaque is to mix micro air bubbles into the coupling resin. The mixed micro air bubbles can disperse light and thereby increase the haze value. Also, an opaque substance may be mixed into the coupling resin. For example, mixing in minute inorganic powder (talc etc.) may increase the haze value of the coupling resin.

Next, a method for detecting the coupling parts 5 of the optical fiber ribbon 1 will be described. Firstly, the single fibers 3*a*, 3*b*, 3*c*, and 3*d* are arranged side by side at predetermined intervals by using a guide roller, for example. In this state, the coupling resin is applied to the predetermined positions around the single fibers by using a coating die or the like.

If the coupling resin is UV curable resin, the single fibers 3*a*, 3*b*, 3*c*, and 3*d* that have passed through the coating die and so on are then sent to a UV irradiation section to cure the coupling parts 5. Alternatively, the coupling parts 5 may be cured by heating or by any other ways. In this way, the optical fiber ribbon 1 is manufactured.

Figure 3:
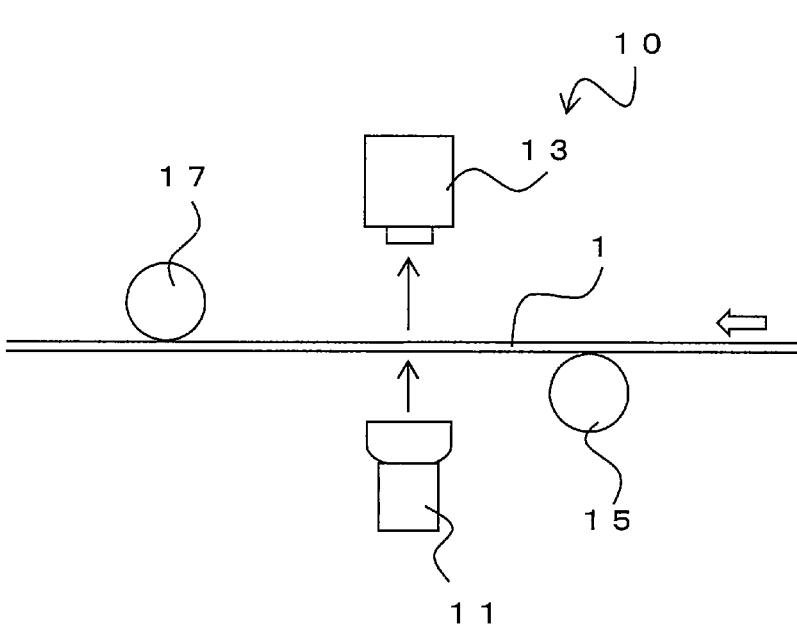
FIG. 3 is a schematic view showing a coupling-part detection device 10.

FIG. 3 is a schematic view of a coupling-part detection device 10. The manufactured optical fiber ribbon 1 is sent to the coupling-part detection device 10. The coupling-part detection device 10 is disposed on the same line as the above-mentioned manufacturing line of the optical fiber ribbon 1. Alternatively, a device for manufacturing the optical fiber ribbon 1 and the coupling part detection device may be on separate lines.

The coupling part detection device 10 mainly includes a guide roller 15, a lighting system 11, a detector 13, and a line-speed measuring instrument 17. The manufactured optical fiber ribbon 1 passes over the lighting system 11 while being positioned by the guide roller 15. Parallel light is irradiated from the lighting system 11, for example.

The detector 13 is disposed above the lighting system 11. That is, the detector 13 is disposed at a position that is opposite to the lighting system 11, with the optical fiber ribbon 1 being interposed therebetween. The detector 13 can detect light being transmitted through the optical fiber ribbon 1.

After passing the lighting system 11 and the detector 13, the optical fiber ribbon 1 comes into contact with the line-speed measuring instrument 17. The line-speed measuring instrument 17 can detect a line speed of the optical fiber ribbon 1. The optical fiber ribbon 1 that has passed the line-speed measuring instrument 17 is then wound up by winding means or the like, of which illustration is omitted in the drawing.

Here, as mentioned above, the single fibers have colored layers, and the colored layers shield the light from the lighting system 11. Also, the coupling parts 5 are not completely transparent, and thus the coupling parts 5 also shield the light. Since the single fibers are arranged leaving gaps therebetween, the light is transmitted through the gaps between the single fibers except for the parts where the coupling parts 5 are disposed.

The detector 13 can detect the light transmitted through the gaps between the single fibers except for the parts where the coupling parts 5 are disposed. That is, the detector 13 can detect the coupling parts 5 on the gaps between the single fibers. A control unit (omitted in the drawing) stores in a storage unit (omitted in the drawing) information of the coupling parts 5 detected by the detector 13 and position information obtained based on line-speed information from the line-speed measuring instrument 17. At this time, if there are cases in which the coupling part 5 that should be detected is not detected (when transmitted light is detected), a length of the coupling part 5 is shorter than a predetermined length, the coupling part 5 is detected at a part at which the coupling part 5 should not exist (when transmitted light is not detected), or the like, the control unit can decide that such cases are abnormal.

As described above, according to the present embodiment, the coupling parts 5 are opaque, and thus it is possible to suppress misjudgment of the abnormality of the coupling parts occurring due to the coupling parts 5 transmitting the light, and this makes it easier for quality control of the coupling parts 5 on a detection line. Also, using the colored single fibers and making the haze values of the single fibers 90% or more can improve color recognition. Also, by making the haze value of the coupling parts 5 greatly different from the haze values of the single fibers but still keeping the coupling parts 5 opaque, it is possible, from the light quantity detected by the detector 13, to distinguish between the single fibers, the coupling parts 5, and the gaps between the single fibers. Thus, parts where the single fibers are in contact with each other can be distinguished from the coupling parts 5.

Working Examples

Detection and the like of the coupling parts in practice are evaluated by using an optical fiber ribbon. First, twelve single fibers each having a colored layer and a 200 μm diameter are arranged side by side in parallel. At this time, the single fibers are arranged side by side with a pitch of 250 μm. That is, there is a gap of 50 μm formed between the single fibers. It is preferable to leave a gap of 50 μm or more to sufficiently transmit light through the gap between the single fibers.

The single fibers are coupled to each other by filling the coupling resin at a predetermined pitch into the spaces between the adjacent single fibers. A length of the coupling part is 10 mm, and a length of a non-coupling part is 30 mm. Also, the coupling parts that are adjacent to each other with regard to the width direction are disposed in a zigzag arrangement with regard to the longitudinal direction. The applied coupling resin is cured by UV irradiation. The coupling resin is made opaque by mixing violet pigment. At this time, an amount of the pigment is varied so as to provide various types of optical fiber ribbons with different haze values.

The haze value is measured by the following method. First, a 10 cm-square glass substrate is disposed on a spin coater, and the coupling resin used to produce the optical fiber ribbon is spread and applied on the glass substrate to have a thickness of approximately 5 to 10 μm while controlling the rotation speed. The glass substrate is then placed in a purge box with nitrogen atmosphere, and UV light with an intensity of 1000 mw/cm$^2$ and irradiation value of 1000 mJ/cm$^2$ is irradiated by using a UV lamp to make a sheet. The obtained sheet is used to measure the haze value in accordance with JIS K 7136.

The states of the coupling parts are examined while running each of the obtained optical fiber ribbons on the same line as the coupling-part detecting device 10 shown in FIG. 3. Through the examination, if there is a position at which the coupling part actually exists but is not detected and the position is decided as the separated coupling part, the position is pinpointed and the optical fiber ribbon is rewound to the position to visually check if there is actually a separation.

The position at which the detecting device decides that the coupling part is separated but the coupling part is not separated in reality is counted as false detection, and a false detection rate is calculated. The false detection exists if there is false detection at least at one position for every 1 km of the optical fiber ribbon and the false detection does not exist if there is no false detection for the 1 km; and a probability rate of false detection after examining 100 km of the optical fiber ribbon is calculated as the false detection rate.

Also, the obtained optical fiber ribbons are visually checked to decide if the coupling parts look dull or not. Ten people took part in the test, comparing the coupling parts with the one with the highest transparency (Comparison Example 1 below). The coupling part which at least one person finds too dull is marked as "bad", and the coupling part that no one finds too dull is marked as "good". The results are shown in Table 1.

TABLE 1

| | Work-ing Exam-ple 1 | Work-ing Exam-ple 2 | Work-ing Exam-ple 3 | Work-ing Exam-ple 4 | Compar-ison Exam-ple 1 | Compar-ison Exam-ple 2 |
|---|---|---|---|---|---|---|
| Haze Value of Coupling Parts (%) | 1.5 | 1.8 | 2.4 | 3.0 | 1.2 | 3.3 |
| False Detection Rate (%) | 8 | 4 | 1 | 0 | 62 | 0 |
| Dullness | good | good | good | good | good | bad |

For Working Examples 1 to 4 in which the coupling resin is moderately opaque with haze values between 1.5% and 3%, the false detection rates are low as 10% or less. In particular, when the haze value is more than 2%, the false detection rate is 1% or less. Also, in Working Examples 1 to 4, there is no dullness found and the colors of the colored layers of the single fibers can be visually recognized with ease.

In contrast, in Comparison Example 1 in which the haze value is small (being transparent), the false detection rate is high and accurate evaluation on the coupling parts is impossible. Also, in Comparison Example 2 in which the haze value is more than 3%, although the false detection rate is low, dullness is too strong and it is hard to distinguish the colors of the colored layers of the single fibers.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. An optical fiber ribbon comprising:
   a plurality of single fibers that are arranged side by side, wherein the single fibers that are adjacent to each other are coupled with coupling resin;
   coupling parts between the adjacent single fibers are disposed intermittently with regard to a longitudinal direction of the single fibers;
   the coupling resin is opaque;
   a haze value of the coupling resin according to JIS K 7136 established on Feb. 20, 2000, by Japanese Industrial Standards Committee is between 1.5% and 3%; and
   each of the single fibers has a colored coating layer, and a haze value of the colored coating layer measured according to JIS K 7136 is 90% or more.

2. The optical fiber ribbon according to claim 1, wherein there is a gap formed between the adjacent single fibers.

3. The optical fiber ribbon according to claim 1, wherein pigment is mixed into the coupling resin and the coupling resin is colored.

4. The optical fiber ribbon according to claim 1, wherein air bubbles are mixed into the coupling resin.

* * * * *